(12) United States Patent
Chopra et al.

(10) Patent No.: US 11,099,941 B2
(45) Date of Patent: Aug. 24, 2021

(54) SYSTEM AND METHOD FOR ACCELERATING APPLICATION SERVICE RESTORATION

(71) Applicant: EMC IP Holding Company LLC, Hopkinton, MA (US)

(72) Inventors: Shelesh Chopra, Bangalore (IN); Krishnendu Bagchi, Bangalore (IN); Vipin Kumar Kaushal, Bharthana Etawah (IN); Nitin Anand, Bangalore (IN); Pallavi Prakash, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 16/392,588

(22) Filed: Apr. 23, 2019

(65) Prior Publication Data
US 2020/0341857 A1 Oct. 29, 2020

(51) Int. Cl.
*G06F 11/00* (2006.01)
*G06F 11/14* (2006.01)

(52) U.S. Cl.
CPC ...... *G06F 11/1458* (2013.01); *G06F 11/1453* (2013.01); *G06F 2201/815* (2013.01)

(58) Field of Classification Search
CPC ............ G06F 11/1469; G06F 11/1451; G06F 11/1448; G06F 11/1458; G06F 11/1453; G06F 11/203; G06F 16/22
See application file for complete search history.

(56) References Cited

U.S. PATENT DOCUMENTS

| | | |
|---|---|---|
| 7,395,244 B1 | 7/2008 | Kingsford |
| 8,510,271 B1 | 8/2013 | Tsaur et al. |
| 8,554,918 B1 | 10/2013 | Douglis |
| 9,037,547 B1 | 5/2015 | Shivdeo |
| 9,092,248 B1 | 7/2015 | Makin et al. |
| 9,256,725 B2 | 2/2016 | Oprea et al. |
| 9,311,375 B1 | 4/2016 | Naik |
| 9,646,256 B2 | 5/2017 | Chamness |

(Continued)

OTHER PUBLICATIONS

Roemer et al., Improving Virtual Machine Migration via Deduplication, 2014, IEEE (Year: 2014).*

(Continued)

*Primary Examiner* — Marc Duncan
(74) *Attorney, Agent, or Firm* — Chamberlain, Hrdlicka, White, Williams & Aughtry

(57) ABSTRACT

A method for providing an application service to clients includes identifying a failure of the application service that causes the application service to be suspended; in response to identifying the failure: instantiating an instance of an application for providing the application service in a production host; identifying at least one virtual disk level backup that is: associated with the application and is a portion of deduplicated backups; extracting the at least one virtual disk level backup from deduplicated backups to obtain a copy of the at least one virtual disk level backup; identifying application data associated with the application within the copy of the at least one virtual disk level backup; transitioning an application service session for a client of the clients to the instance of the application; and resuming the application service for the client using the instance of the application and the application data.

20 Claims, 15 Drawing Sheets

(56) References Cited

U.S. PATENT DOCUMENTS

| | | | |
|---|---|---|---|
| 9,658,925 | B1 | 5/2017 | Damodharan et al. |
| 9,740,577 | B1 | 8/2017 | Chakraborty et al. |
| 9,805,075 | B1 | 10/2017 | Bachu |
| 9,977,704 | B1 | 5/2018 | Chopra et al. |
| 10,061,657 | B1 | 8/2018 | Chopra et al. |
| 10,216,583 | B1 | 2/2019 | Krinke |
| 10,339,012 | B2 * | 7/2019 | Hegdal ............... G06F 11/2033 |
| 2004/0098423 | A1 | 5/2004 | Chigusa |
| 2007/0239755 | A1 | 10/2007 | Mahoney |
| 2008/0244601 | A1 | 10/2008 | Zeis |
| 2009/0320029 | A1 | 12/2009 | Kottomtharayil |
| 2010/0122248 | A1 | 5/2010 | Robinson et al. |
| 2010/0257523 | A1 * | 10/2010 | Frank .................. G06F 9/45558 718/1 |
| 2014/0059209 | A1 | 2/2014 | Alnoor |
| 2014/0095817 | A1 | 4/2014 | Hsu et al. |
| 2015/0234713 | A1 | 8/2015 | Shimada |
| 2018/0032409 | A1 | 2/2018 | Surakanti et al. |
| 2018/0067819 | A1 | 3/2018 | Kotha |
| 2018/0143990 | A1 | 5/2018 | Figueroa et al. |
| 2018/0225311 | A1 | 8/2018 | Bandopadhyay et al. |
| 2019/0095452 | A1 | 3/2019 | Whitmer |
| 2019/0286530 | A1 | 9/2019 | Talley et al. |
| 2020/0007620 | A1 | 1/2020 | Das et al. |
| 2020/0183652 | A1 | 6/2020 | Krebs et al. |
| 2020/0341851 | A1 * | 10/2020 | Rana ................... G06F 11/1448 |

OTHER PUBLICATIONS

Fu, Min et al., Accelerating Restore and Garbage Collection in Deduplication-based Backup Systems via Exploiting Historical Information, 2014, USENIX (Year: 2014).*

Dubois, Laura et al., Backup and Recover: Accelerating Efficiency and Driving Down IT Costs Using Data Deduplication, Feb. 2010, IDC (Year: 2010).*

Extended European Search Report issued in corresponding European Application No. 20166272.3, dated Sep. 28, 2020.

Extended European Search Report issued in corresponding European Application No. 20168729.0, dated Sep. 8, 2020.

Extended European Search Report issued in corresponding European Application No. 20169836.2, dated Sep. 8, 2020.

* cited by examiner

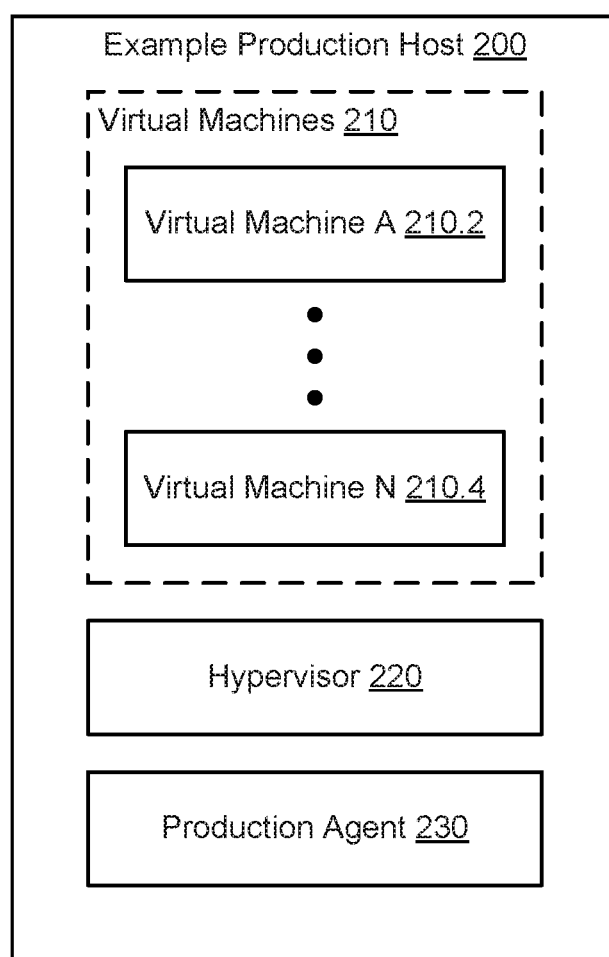
FIG. 2.1

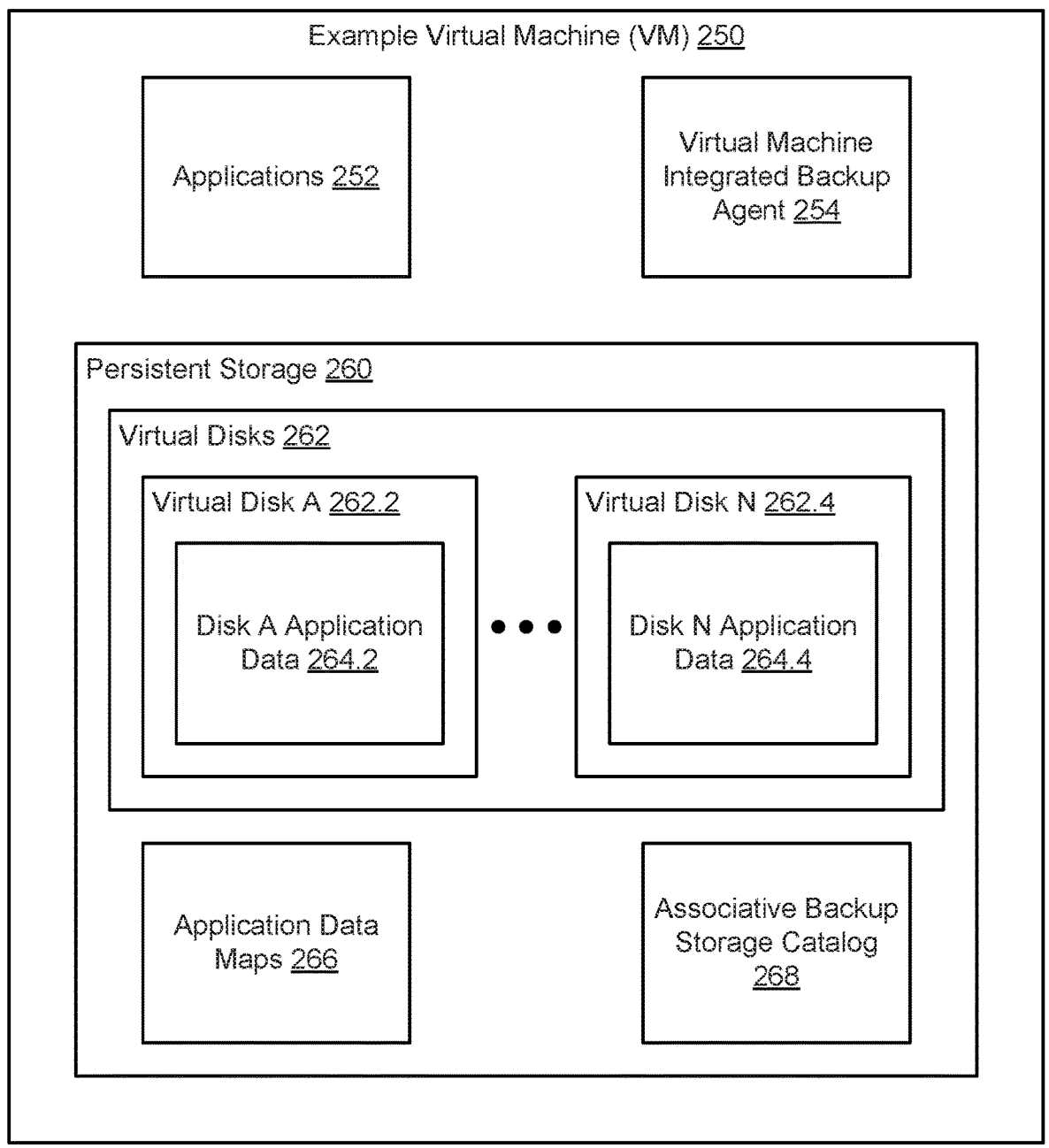
FIG. 2.2

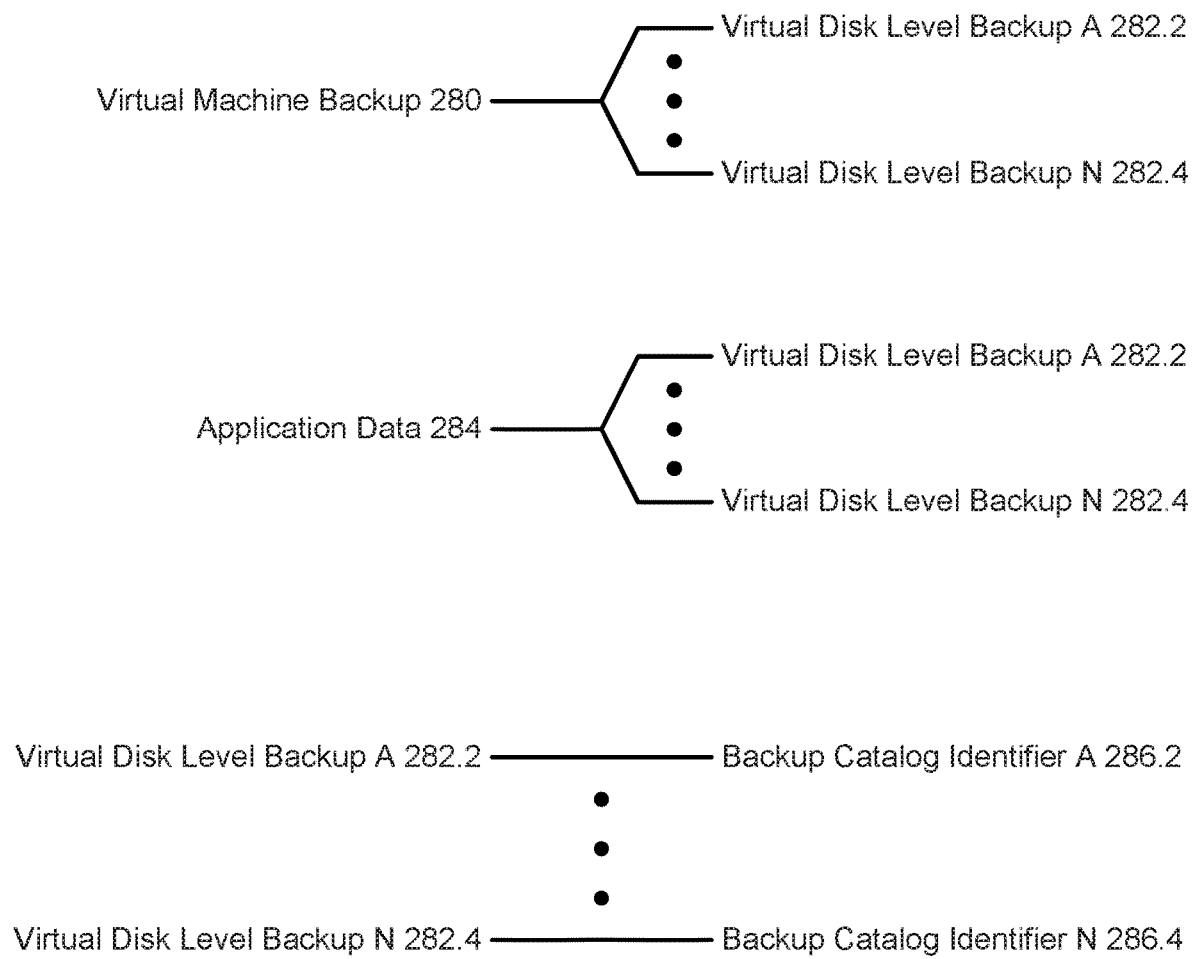
FIG. 2.3

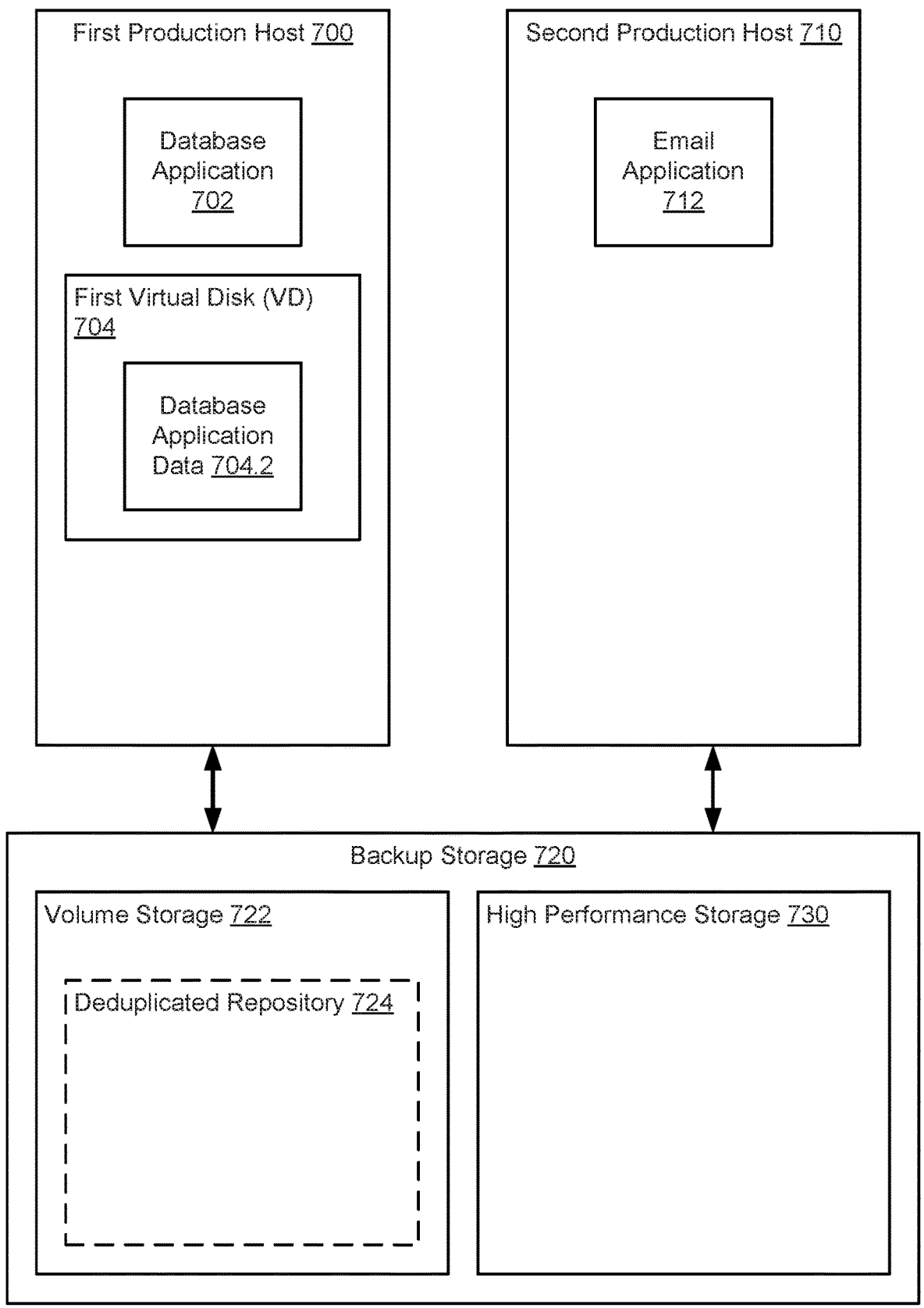
FIG. 7.1

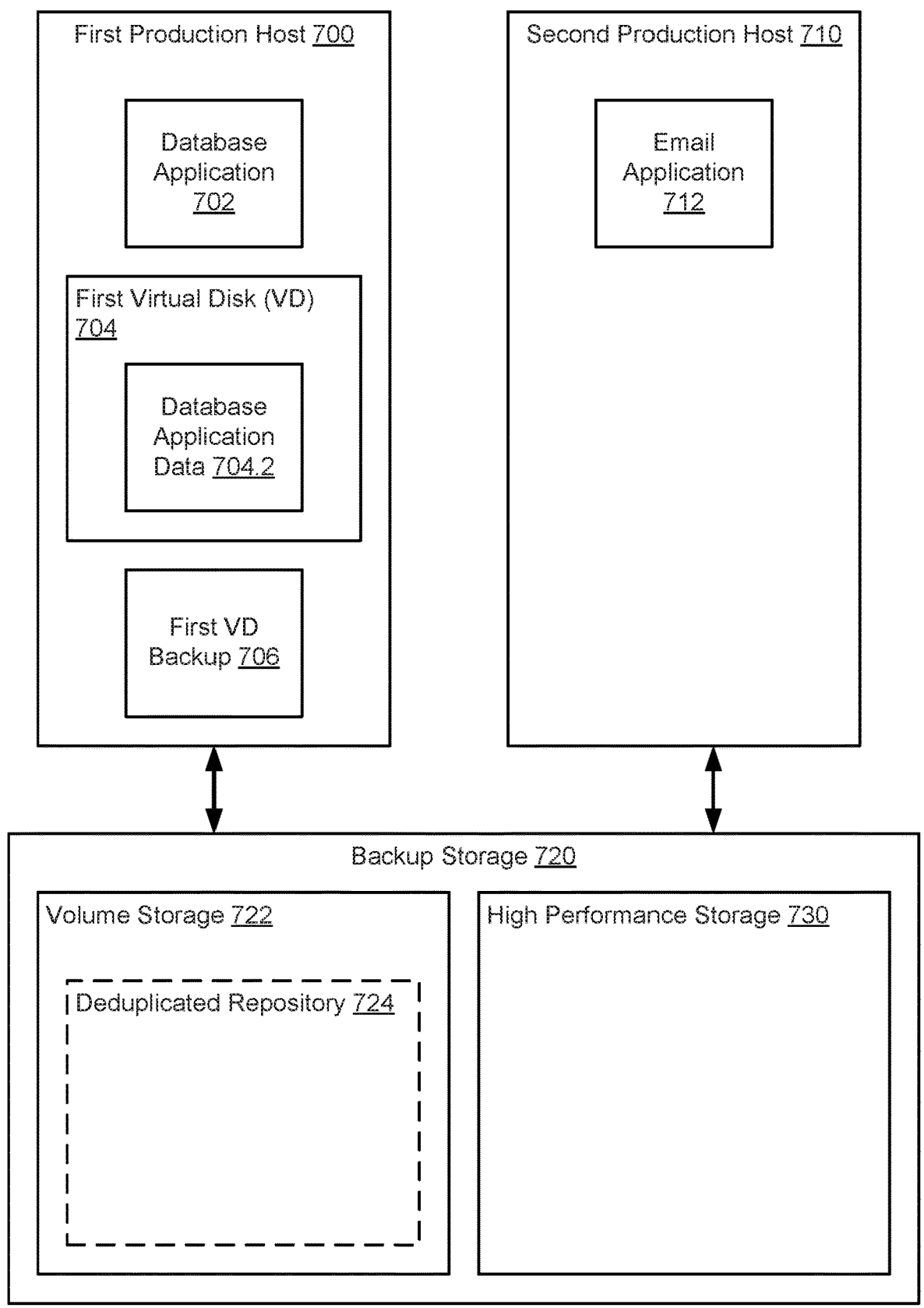
FIG. 7.2

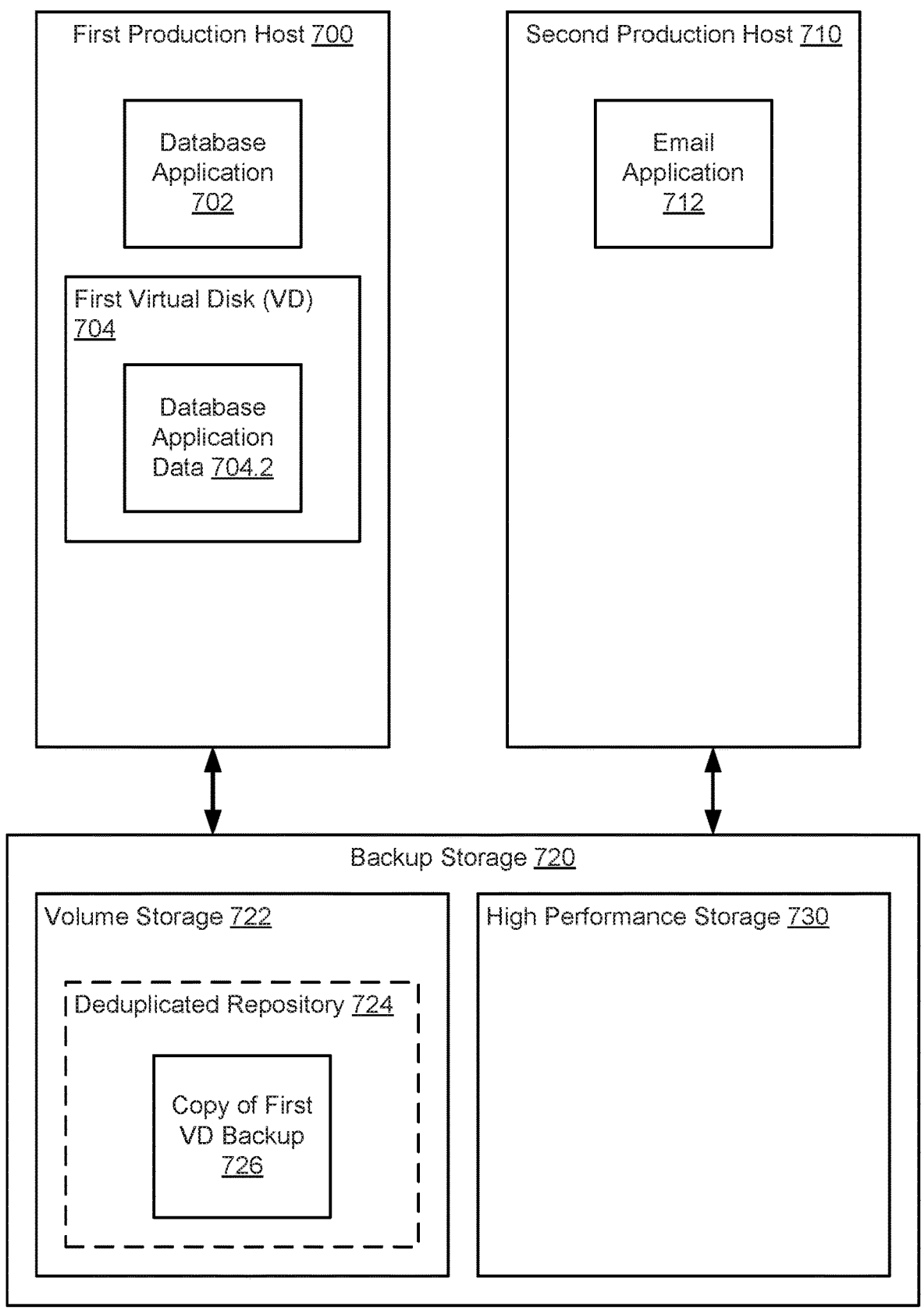
FIG. 7.3

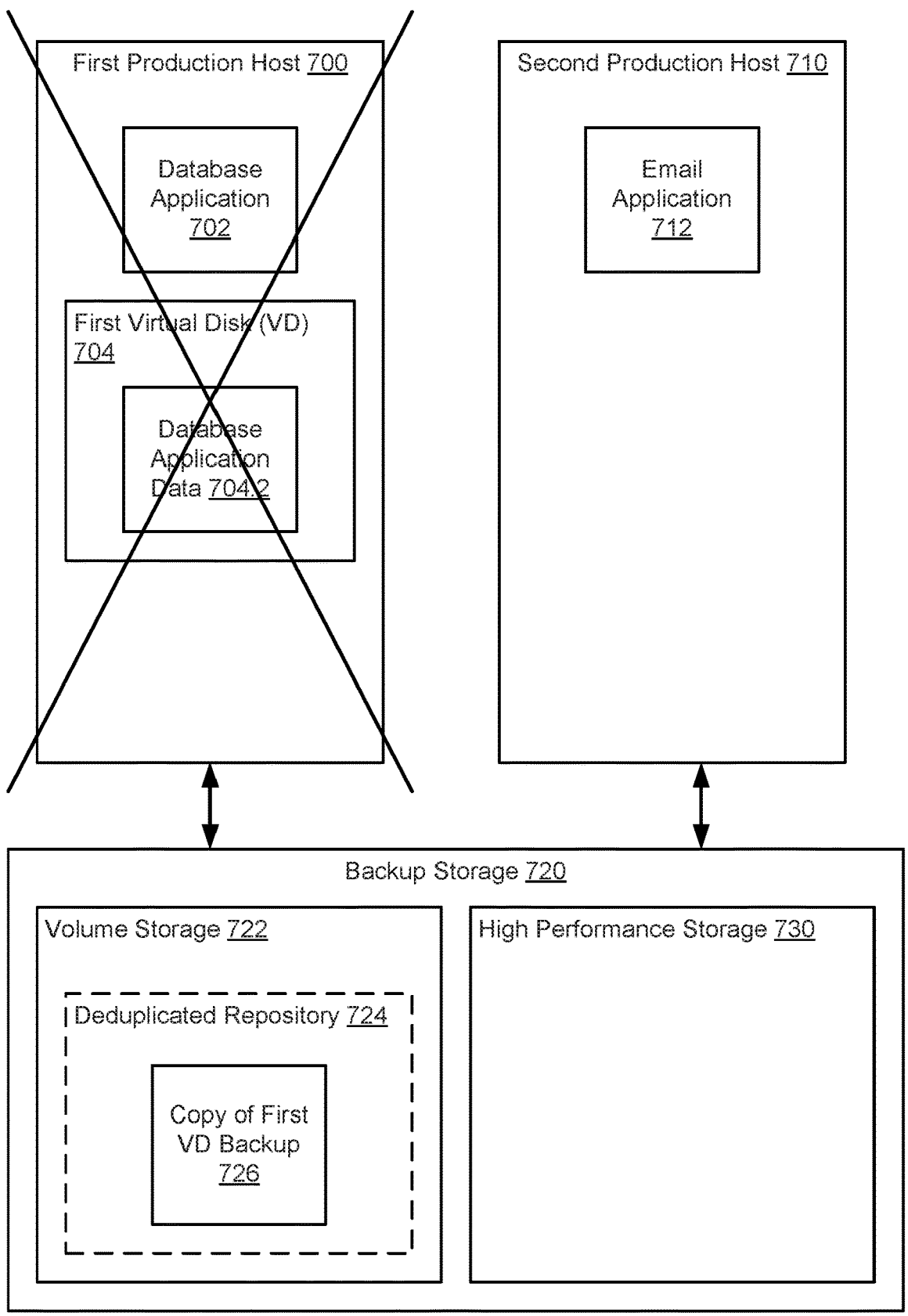
FIG. 7.4

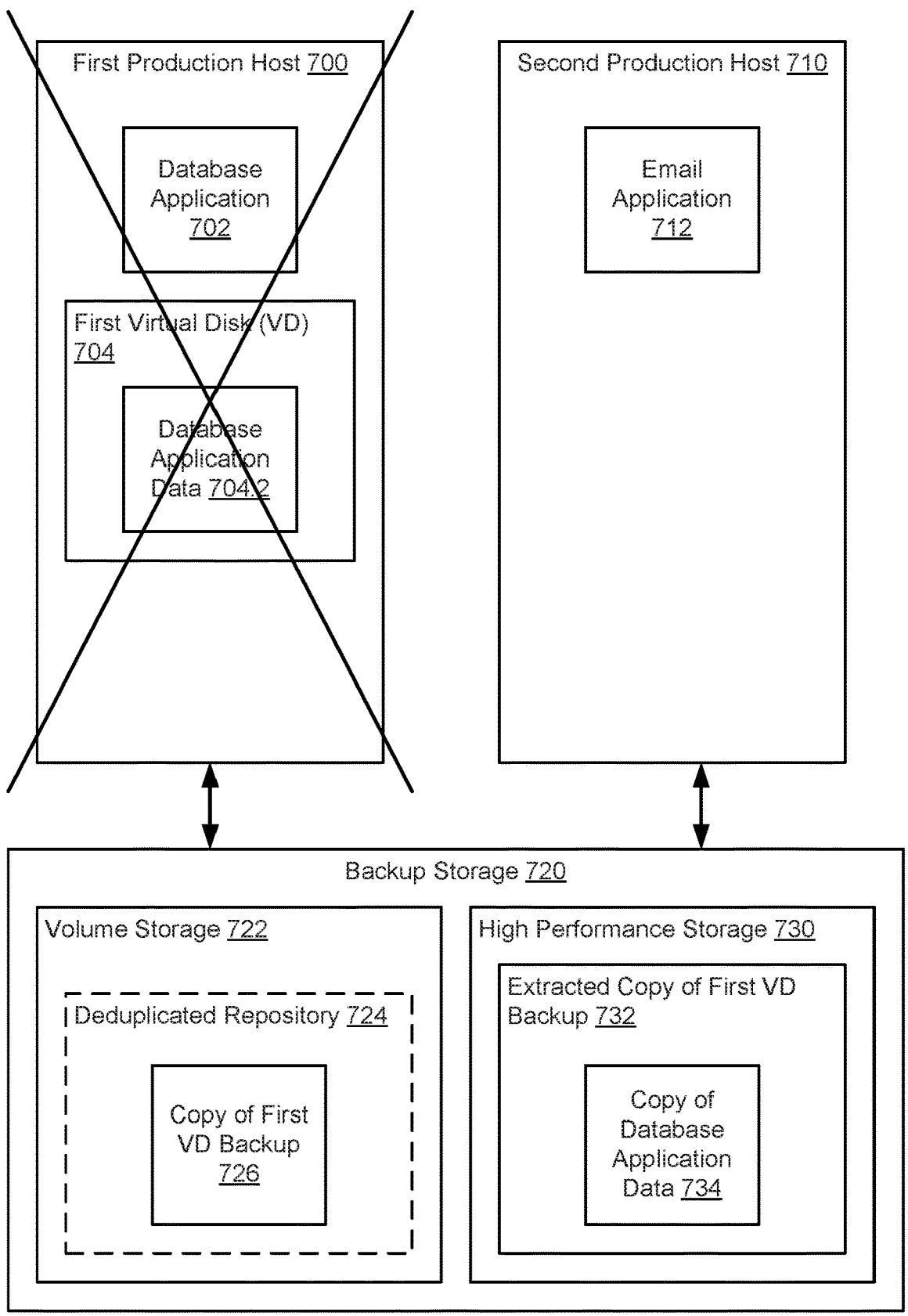
FIG. 7.5

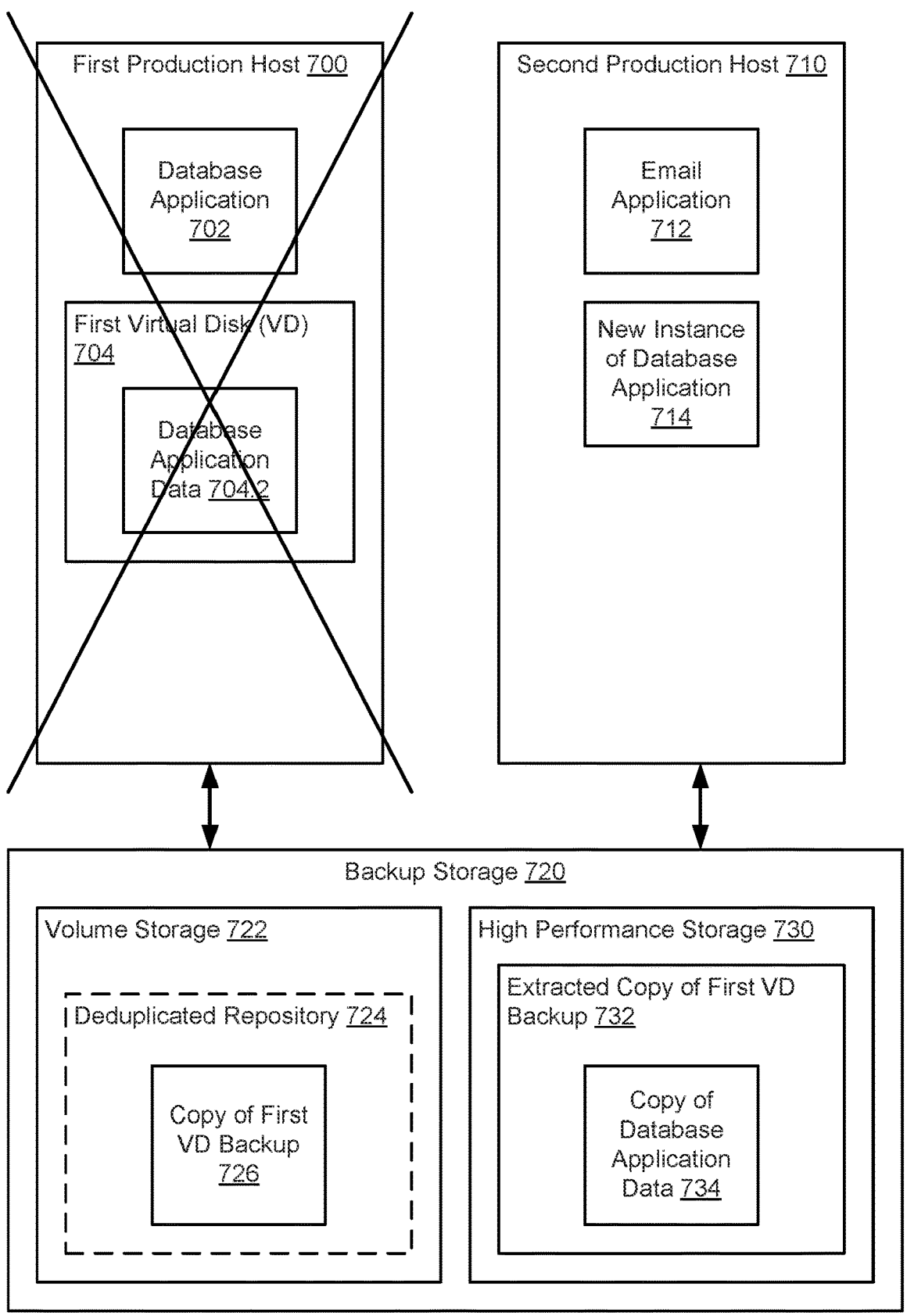
FIG. 7.6

SYSTEM AND METHOD FOR ACCELERATING APPLICATION SERVICE RESTORATION

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

SUMMARY

In one aspect, a system for providing an application service to clients in accordance with one or more embodiments of the invention includes a backup storage and a remote agent. The backup storage includes persistent storage for storing deduplicated backups. The remote agent identifies a failure of the application service that causes the application service to be suspended; in response to identifying the failure: instantiates an instance of an application for providing the application service in a production host; identifies at least one virtual disk level backup that is: associated with the application and is a portion of the deduplicated backups; extracts the at least one virtual disk level backup from the deduplicated backups to obtain a copy of the at least one virtual disk level backup; identifies application data associated with the application within the copy of the at least one virtual disk level backup; transitions an application service session for a client of the clients to the instance of the application; and resumes the application service for the client using the instance of the application and the application data.

In one aspect, a method for providing an application service to clients in accordance with one or more embodiments of the invention includes identifying a failure of the application service that causes the application service to be suspended; in response to identifying the failure: instantiating an instance of an application for providing the application service in a production host; identifying at least one virtual disk level backup that is: associated with the application and is a portion of deduplicated backups; extracting the at least one virtual disk level backup from deduplicated backups to obtain a copy of the at least one virtual disk level backup; identifying application data associated with the application within the copy of the at least one virtual disk level backup; transitioning an application service session for a client of the clients to the instance of the application; and resuming the application service for the client using the instance of the application and the application data.

In one aspect, a non-transitory computer readable medium in accordance with one or more embodiments of the invention includes computer readable program code, which when executed by a computer processor enables the computer processor to perform a method for providing an application service to clients. The method includes identifying a failure of the application service that causes the application service to be suspended; in response to identifying the failure: instantiating an instance of an application for providing the application service in a production host; identifying at least one virtual disk level backup that is: associated with the application and is a portion of deduplicated backups; extracting the at least one virtual disk level backup from deduplicated backups to obtain a copy of the at least one virtual disk level backup; identifying application data associated with the application within the copy of the at least one virtual disk level backup; transitioning an application service session for a client of the clients to the instance of the application; and resuming the application service for the client using the instance of the application and the application data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example production host in accordance with one or more embodiments of the invention.

FIG. 2.2 shows a diagram of an example virtual machine in accordance with one or more embodiments of the invention.

FIG. 2.3 shows a relationship diagram of relationships associated with the system of FIG. 1 in accordance with one or more embodiments of the invention.

FIGS. 7.1-7.6 show a non-limiting example of a system in accordance with embodiments of the invention.

DETAILED DESCRIPTION

Figure 1:
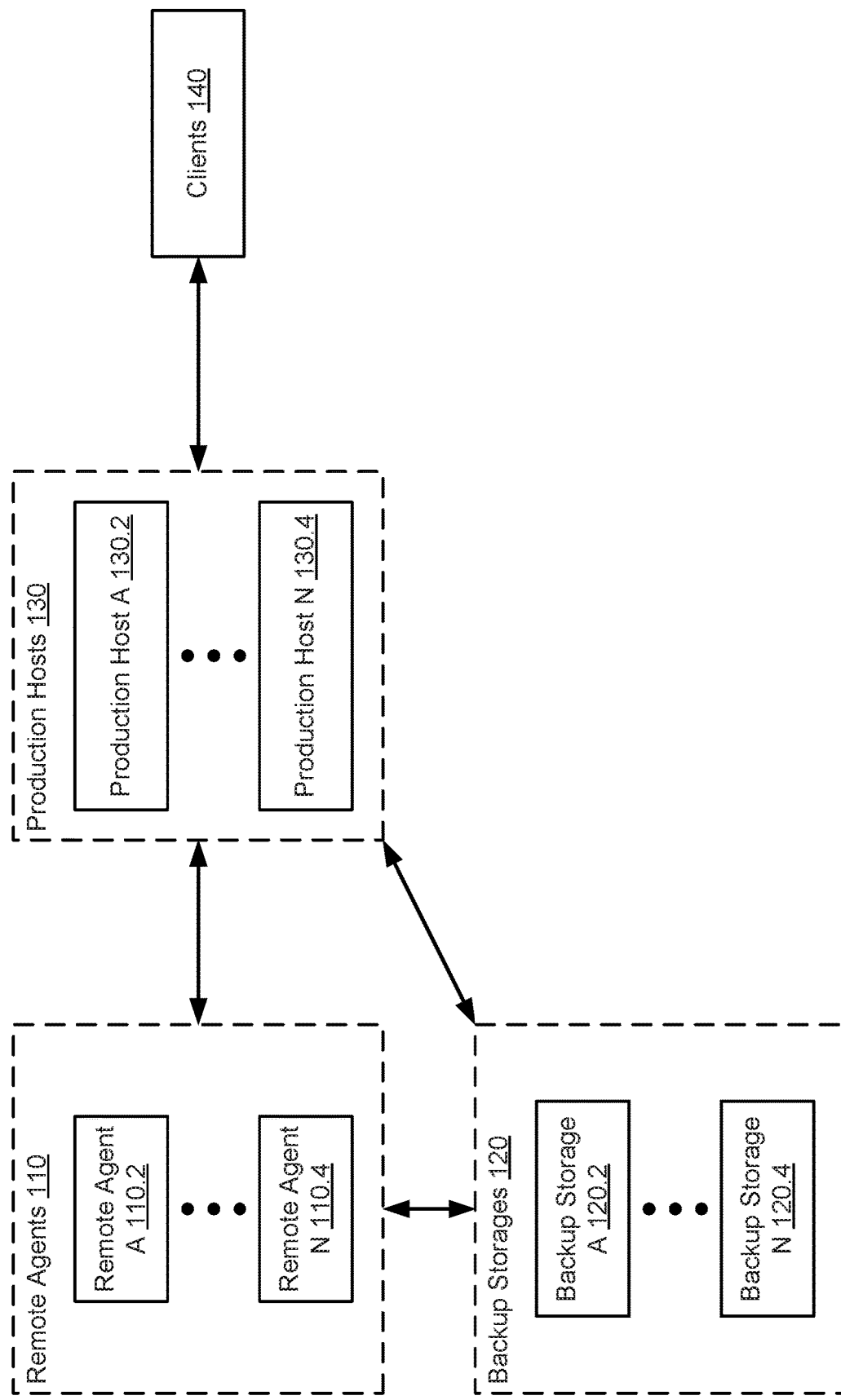
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services in a distributed system. Specifically, embodiments of the invention may provide a system that provides for data protection by storing multiple copies of data throughout the system. By doing so, the failure of any component of the system may not result in data loss.

Additionally, embodiments of the invention may provide for the rapid restoration of application services using copies of data that are replicated throughout the system for data protection purposes. In one or more embodiments of the invention, the copies of the data, i.e., backup data, that are stored throughout the system are stored in a low storage footprint format. Storing data in a low storage footprint format may limit the quantity of storage resources required for storing the data while also limiting the indexing and/or searchability of the backup data.

In one or more embodiments of the invention, the system includes limited indexing functionality that indexes backup data at a disk-level. Thus, while backup data may not be indexed granularly, the backup data may include some level of indexing.

Further embodiments of the invention may enable the limited indexing of stored backup data to be used to selectively obtain application data of the backup data. Application data may be used by applications to provide application services to clients. The application data may be selectively obtained to facilitate rapid restoration of application services. By doing so, embodiments of the invention may restore application services in a manner that is faster than contemporary methods that rely on restoring applications in their entirety.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services provided by the applications. The applications may be, for example, database applications, electronic communication applications, file storage applications, and/or any other type of application that may provide services to the clients (140). By utilizing such services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host, or all, or a portion, of an entity hosted by the production host, to a previous state. Thus, if data hosted by one of the production hosts (130) is lost, access to the data may be restored by restoring all, or a portion, of the production host using information stored in the backup storages (120).

In addition to restoration purposes, the data stored in the backup storages (120) may be used to rapidly restore the functionality of the applications. In one or more embodiments of the invention, the backup storages (120) may locally mount a portion of data such as, for example, a database and provide remote access to the locally mounted portion of data to the applications. Once access is provided, the applications may utilize the remote portion of data, rather than a locally available portion of data, to provide application services. By doing so, application services may be quickly restored after a failure of the application services without the need to immediately restore a local copy of application data that the applications use to provide the application services.

The system may also include remote agents (110) that provide data protection services to the production hosts (130). The data protection services may include orchestrating generation and storage of backups in the backup storages, orchestrating restorations using the data stored in the backup storages (120), and/or providing rapid, remote access to data stores in the backup storages (120) to resume production of application services.

To maximize the quantity of backup data storable in the backup storages (120), the backups may be stored in a format that is indexed at a disk level and/or the data stored in the backup storages (120) may be deduplicated against other data stored in the backup storages (120). By doing so, the footprint of data stored in the backup storages (120) may be reduced which allows a greater quantity of backup data to be stored using the same quantity of storage resources. However, the data stored in all, or a portion, of the backup storages (120) may not be natively searchable in a computationally efficient manner due to the lack of metadata usable for indexing purposes that would otherwise provide for computationally efficient searching of the data.

To provide rapid, remote access to portions of the data of the backup storages (120), the remote agents (110) may orchestrate storage of data in the production hosts (130) and the backup storages (120) that enables data stored in the backup storages (120) that is relevant to the applications to be identified, mounted for remote access, and utilized to resume provisioning of application services to the clients (140). Such data may include information regarding associations between the data stored in the backup storages (120), the applications, and access information for the data stored in the backup storages (120).

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or a portion, of the methods illustrated in FIGS. 4-6. The clients (140) may be other types of computing devices without departing from the invention. For additional details regarding computing devices, refer to FIG. 8.

The clients (140) may be logical devices without departing from the invention. For example, the clients (140) may be virtual machines that utilize computing resources of any number of physical computing devices to provide the functionality of the clients (140). The clients (140) may be other types of logical devices without departing from the invention.

In one or more embodiments of the invention, the clients (140) utilize application services provided by the production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services, provided by an application hosted by the production hosts (130), by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts, or a portion of the production hosts, in the backup storages (120).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or a portion, of the methods illustrated in FIGS. 4-6. The production hosts (130) may be other types of computing devices without departing from the invention. For additional details regarding computing devices, refer to FIG. 8.

In one or more embodiments of the invention, the production hosts (130) are distributed computing devices. As used herein, a distributed computing device refers to functionality provided by a logical device that utilizes the computing resources of one or more separate and/or distinct physical computing devices. For example, in one or more embodiments of the invention, the production hosts (130) may be distributed devices that include components distributed across any number of separate and/or distinct computing devices. In such a scenario, the functionality of the production hosts (130) may be performed by multiple, different computing devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may be any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) perform backup services such as, for example, generating and storing backups in backup storages (120). By storing backups in the backup storages (120), copies of data stored in persistent storage of the production hosts (130) may be redundantly stored in the backup storages (120). By redundantly storing copies of data in both the production hosts (130) and the backup storages (120), it may be more likely that the stored data will be able to be retrieved at a future point in time. For example, if a production host (e.g., 130.2) suffers a catastrophic failure or other type of data loss/corruption event, the data on the production host's persistent storage may be lost. However, because a copy of the data may be stored in the backup storages (120), it may be possible to retrieve the data for use after the catastrophic failure. Thus, embodiments of the invention may improve the reliability of data storage in a distributed system.

Backup services may also include generating application data maps that associate applications with backups stored in the backup storages (120). The application data maps may be utilized by the remote agents (110) and/or the backup storages (120) to selectively provide remote access to data. For example, the application data maps may be used to identify portions of the data included in the backup storages (120) that is associated with each of the applications without crawling or otherwise indexing all of the data stored in the backup storages (120). By doing so, rapid remote access to data that may be used by the applications to provide application services may be identified, placed in a usable condition by the applications, and placed in a location easily accessible to the applications. For additional details regarding the production hosts (130), refer to FIG. 2.1.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIGS. 4-6. The backup storages (120) may be other types of computing devices without departing from the invention. For additional details regarding computing devices, refer to FIG. 8.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) are distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored by the backup storages (120) includes backups of virtual machines. For example, the production hosts (130) may host a virtual machine that hosts a database application. To generate backups of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used to restore the application data hosted by the virtual machine hosting the database to a state associated with the backup, i.e., the desired previous state.

In addition to providing data storage services, the backup storages (120) may provide rapid, remote access to portions of previously stored data in the backup storages (120). To do so, the backup storages (120) may maintain a limited index of data stored in the backup storages (120). The limited index may include a listing of each of the virtual disk level backups stored in the backup storages (120) and access information for each of the aforementioned virtual disk level backups. Such information may be used to retrieve the virtual disk level backups while limiting the storage footprint of metadata, i.e., the limited index, regarding the data stored in the backup storages (120).

Once virtual disk level backups are retrieved, the virtual disk level backups may be mounted for remote access by the applications. The applications may use the remote virtual disk level backups to provide application services. By doing so, applications that are in a state that makes them unable to provide application services because of lack of access to application data may be rapidly provided access to such application data. The aforementioned process may be substantially faster than locally restoring the application data for the applications.

While described above as storing backups of virtual machines, the backup storages (120) may store other types of data from the production hosts (130), or other entities, without departing from the invention. For example, the backup storages (120) may store archives or other data structures from the clients (140) and/or other entities. For additional details regarding the backup storages (120), refer to FIG. 3.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the remote agents (110) described through this application and all, or a portion, of the methods illustrated in FIGS. 4-6. The remote agents (110) may be other types of computing devices without departing from the invention. For additional details regarding computing devices, refer to FIG. 8.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) are distributed devices that include components distributed across any number of separate and/or distinct computing devices. In such a scenario, the functionality of the remote agents (110) may be performed by multiple, different computing devices without departing from the invention.

In one or more embodiments of the invention, the backup storages (120) provide the functionality of the remote agents. For example, the backup storages (120) may host applications that provide all, or a portion, of the functionality of the remote agents (110).

In one or more embodiments of the invention, the remote agents (110) orchestrate provisioning of backup services to the production hosts (130). For example, the remote agents (110) may initiate the process of backup generation for the production hosts (130) and storage of the generated backups in the backup storages (120). The remote agents (110) may initiate such processes based on backup policies that specify when backups are to be generated, where the backups are to be stored, and/or other characteristics of the backup generation process. Such policies may specify the behavior of the system, for backup generation purposes, at any level of granularity.

Additionally, the remote agents (110) may orchestrate restoration of the production hosts (130) and/or entities hosted by the production hosts using backups stored in the backup storages (120). For example, remote agents (110) may initiate copying of backups from the backup storages to the production hosts (130) and may initiate restorations using the copied backups. The system of FIG. 1 may include any number of remote agents (e.g., 110.2, 110.4).

Further, the remote agents (110) may orchestrate the process of restoring application services using data stored in the backup storages (120). For example, the remote agents (110) may send instructions to the backup storages (120) to locally mount virtual machine level backups for remote access by the production hosts (130). Once remote access is provided, the remote agents (110) may instruct the applications hosted by the production hosts (130) to utilize the remotely accessible data hosted by the backup storages (120) to used application data of the virtual machine level backups to provide the application services. By doing so, the system of FIG. 1 may transition providing backup services to the clients (140) between applications if any of the applications are unable to continue to provide application services.

In some embodiments of the invention, the remote agents (110) may orchestrate instantiation of new instances of applications in the production hosts (130). Once instantiated, the remote agents (110) may instruct the instantiated instances of the applications to use application data remotely hosted by the backup storages (120). By doing so, new instances of the application that are able to provide application services desired by the clients (140) may be generated more quickly than performing a restoration to generate such applications.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, production hosts may host virtual machines, applications, or other entities that provide services to the clients. FIG. 2.1 shows a diagram of an example production host (200) in accordance with one or more embodiments of the invention. The example production host (200) may be similar to any of the production hosts (130, FIG. 1). As discussed above, the example production hosts (200) may provide: (i) application services to the clients, (ii) backup services to the entities that provide the application services to the clients, and (iii) restoration services.

To provide the aforementioned functionality of the example production host (200), the example production host (200) may include virtual machines (210), a hypervisor (220), and a production agent (230). Each component of the example production host (200) is discussed below.

The virtual machines (210) may be applications. For example, the virtual machines (210) may be applications executing using physical computing resources of the example production host (200) and/or other entities. In other words, each of the virtual machines (210) may be implemented as computer instructions stored on a persistent storage that when executed by a processor of the example production host (200) and/or other entities give rise to the functionality of the respective virtual machine. The example production host (200) may host any number of virtual machines (e.g., 210.2, 210.4) without departing from the invention.

Each of the virtual machines (210) may host any number of applications. The applications may provide application services to clients or other entities. For example, the applications may be database applications, electronic communication applications, filesharing applications, and/or other types of applications. Each of the virtual machines (210) may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or a portion, of the applications provide application services to clients. The provided services may correspond to the type of application of each of the applications. When providing application services to the clients, data that is relevant to the clients may be received by and/or generated by the applications. The applications may store such relevant data as part of the application data associated with respective applications in persistent storage of the example production host (200) and/or other entities.

In some embodiments of the invention, portions, or all, of the application data may be stored remotely from the example production host (200). For example, the application data may be stored in a second production host, a backup storage, or another entity, that does not host the applications. The application data may be stored in other locations without departing from the invention.

While the applications have been described above as being hosted by the virtual machines (210), the applications may not be hosted by virtual machines without departing from the invention. For example, the applications may be executing natively on the example production host (200) rather than in a virtualized entity, e.g., one of the virtual machines (210).

Each of the virtual machines (210.2, 204.4) may also generate application data maps. The application data maps may include information that enables a portion of the data stored by backup storages that corresponds to previously stored application data to be identified. The information included in the application data maps may be used to selectively restore application data associated with an application while minimizing the quantity of data restored that is not useful for restoring a particular application. Additionally, the information included in the application data maps may be used to selectively obtain access to application data stored in backup storage. By doing so, an application hosted by the production host may remotely use the application data hosted by the backup storage to provide application services. For additional details regarding the virtual machines (210), refer to FIG. 2.2.

The hypervisor (220) may manage execution of the virtual machines (210). The hypervisor (220) may instantiate and/or terminate any of the virtual machines (210). The hypervisor (220) may also allocate computing resources of the example production host (200) to each of the virtual machines (e.g., 210.2, 210.4).

For example, the hypervisor (220) may allocate a portion of the persistent storage of the example production host (200). Any quantity of storage resources of the persistent storage may be allocated in any manner among the virtual machines (e.g., 210.2, 210.4).

While discussed with respect to storage resources, the hypervisor (220) may allocate other types of computing resources to the virtual machines (210), and/or other entities hosted by the example production host (200), without departing from the invention. For example, the hypervisor (220) may allocate processor cycles, memory capacity, memory bandwidth, and/or network communication bandwidth among the virtual machines (210) and/or other entities hosted by the example production host (200).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The production agent (230) may locally manage provisioning of backup services to the virtual machines (210) and/or entities hosted by the virtual machines (210). For example, the production agent (230) may orchestrate the generation of backups and storage of the generated backups in backup storages (120, FIG. 1). To orchestrate the generation of backups, the production agent (230) may generate virtual machine level backups. A virtual machine level backup may be a backup that represents the state (or difference from one state to another state) of a virtual machine at a point in time. A virtual machine level backup may be discretized at a virtual disk level, i.e., different portions of the generated backup may correspond to different virtual disks used by the virtual machine for data storage purposes. Thus, multiple virtual disk level backups may be portions of a virtual machine backup. As will be discussed in greater detail below, the application data maps may include information that associates the virtual disk level backups to different application. By doing so, information that is relevant to selectively identifying backups stored in backup storage may be created and saved for later use. Such information may be used to selectively obtain application data from backups stored in the back storages.

In one or more embodiments of the invention, the production agent (230) manages the provisioning of backup services for the virtual machines (210) based on instructions received from one or more remote agents. These instructions may cause the production agent (230) to take action to provide the backup services. In other words, the production agents (230) may orchestrate data protection services including generation of backups, performance of restorations across the system, and/or provide remote access to application data extracted from the backups stored in the backup storages.

In one or more embodiments of the invention, the production agent (230) includes functionality to report its activities to the remote agents. For example, the production agent (230) may monitor backups that are generated and send notifications of the generated backups to the remote agents. By doing so, remote agents may be notified of the backup generations for the entities hosted by the example production host (200).

The production agent (230) may also provide restoration services. Restoration services may enable entities that are now inaccessible due to, for example, failure of a host entity such as a production host to be instantiated in other locations and being in predetermined states. To provide restoration services, the production agent (230) may obtain any number of backups from backup storage and restore the entity using the backups. For example, a production agent (230) may obtain a virtual machine level backup and instantiate a copy of a virtual machine using the obtained backup. By doing so, a virtual machine may be restored in a state hosting an application in a predetermined state. Once in the predetermined state, the application may provide desired application services and/or enable access to application data of the application. The entities may be restored to different, desirable states using different combinations of previously generated backups and/or a portion of the backups.

Figure 4:
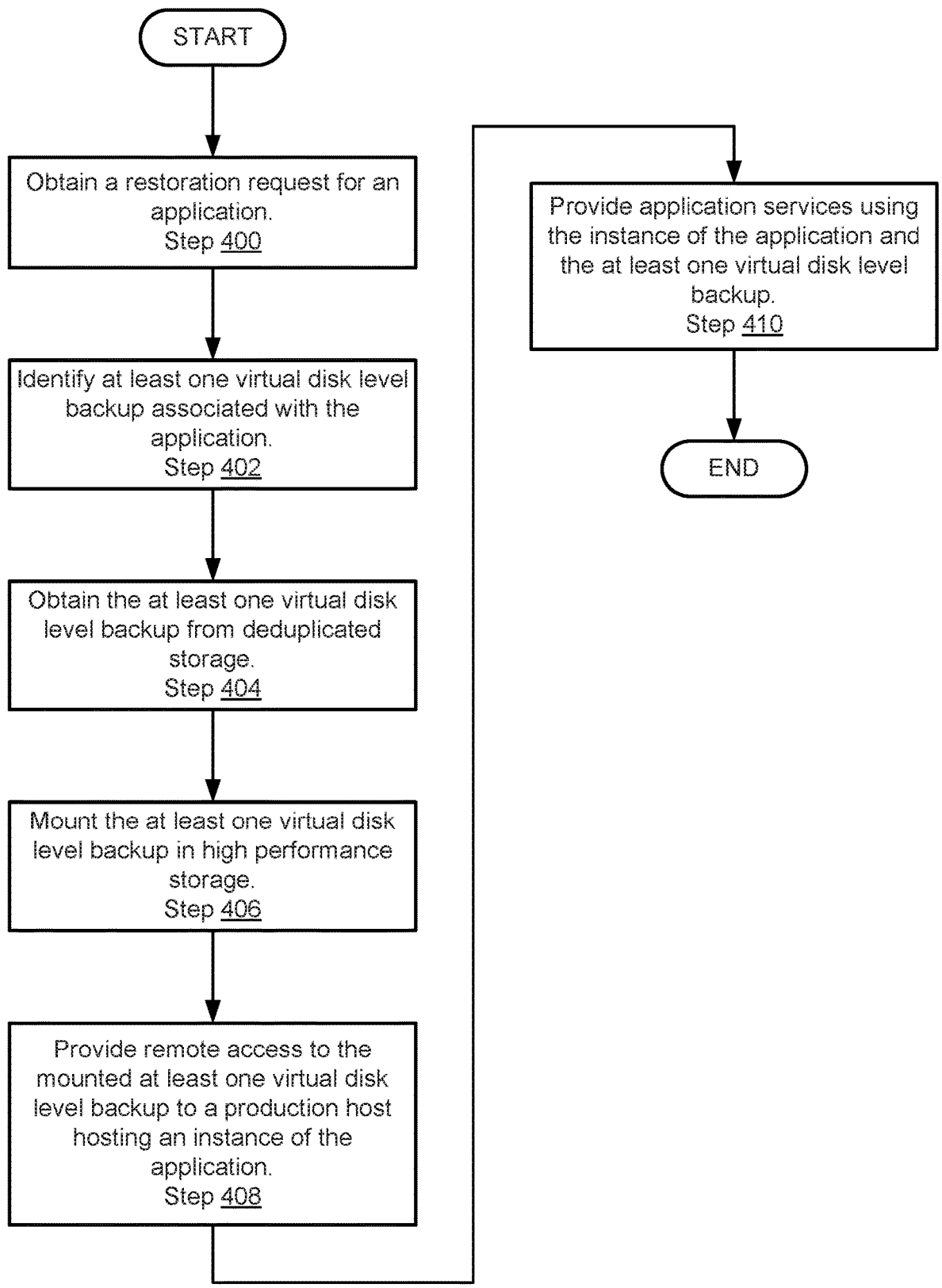
FIG. 4 shows a flowchart of a method of providing access to application data in accordance with one or more embodiments of the invention.
Figure 5:
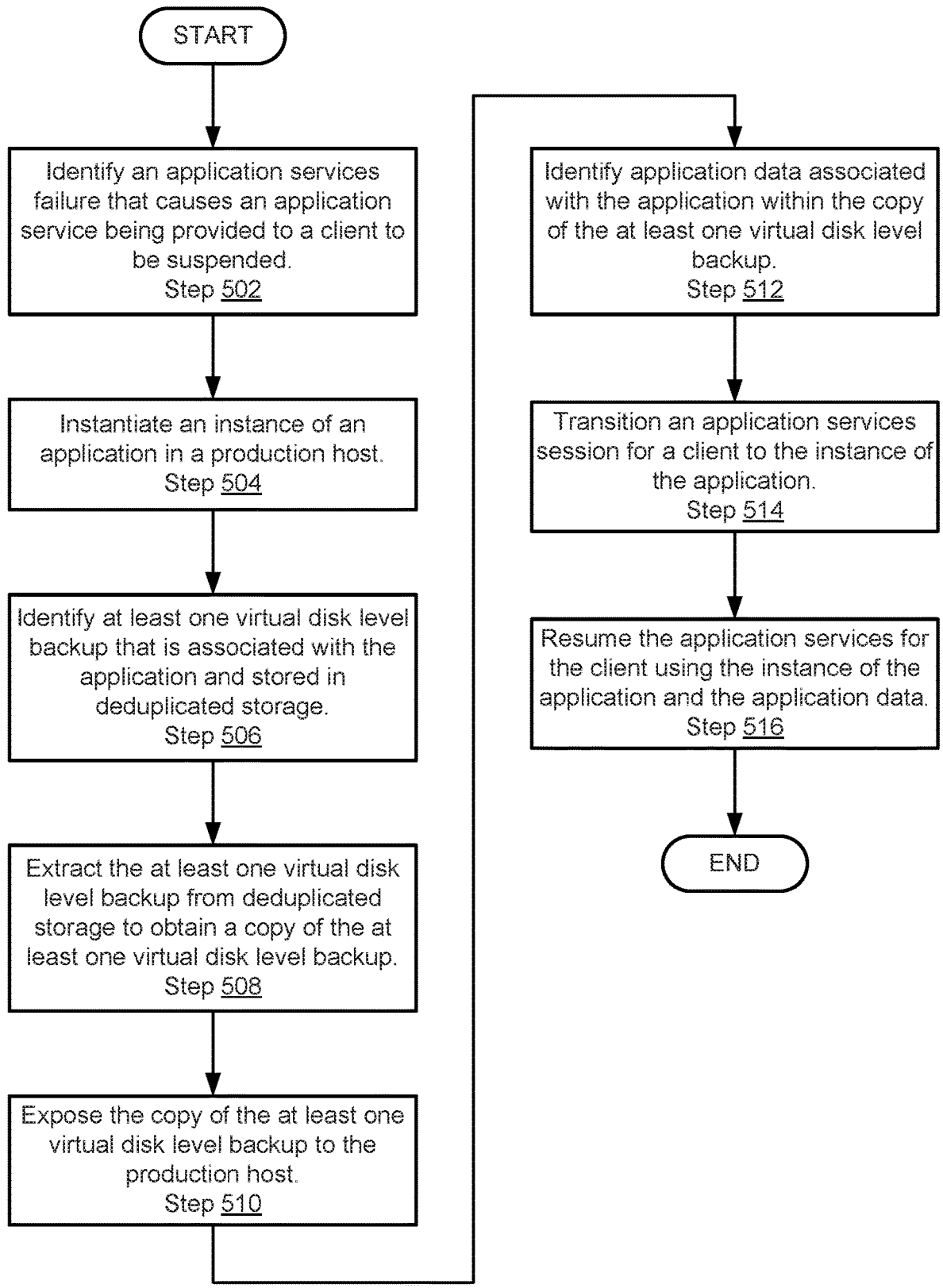
FIG. 5 shows a flowchart of a method of restoring application services in accordance with one or more embodiments of the invention.
Figure 6:
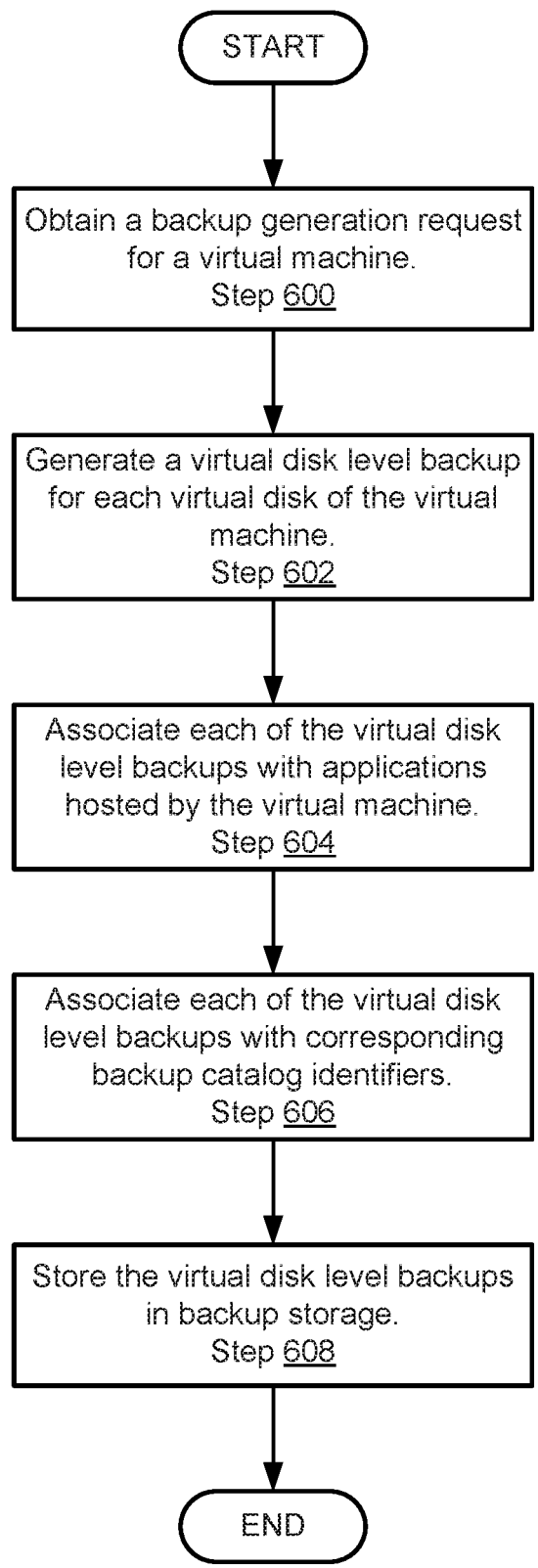
FIG. 6 shows a flowchart of a method of generating a backup in accordance with one or more embodiments of the invention.

To provide the above noted functionality of the production agent (230), the production agent (230) may perform all, or a portion, of the methods illustrated in FIGS. 4-6.

In one or more embodiments of the invention, the production agent (230) is a hardware device including circuitry. The production agent (230) may be, for example, a digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be a hardware processor including circuitry such as, for example, a central processing unit or a microcontroller. The processor may be other types of hardware devices for processing digital information without departing from the invention.

While the example production host (200) of FIG. 2.1 has been described and illustrated as including a limited number of components for the sake of brevity, a production host in accordance with embodiments of the invention may include additional, fewer, and/or different components than those illustrated in FIG. 2.1 without departing from the invention.

As discussed above, virtual machines hosted by the production hosts may provide services to clients. FIG. 2.2 shows a diagram of an example virtual machine (250) in accordance with one or more embodiments of the invention.

The example virtual machine (250) may include persistent storage (260), e.g., logically storage resources, that is logically divided into any number of virtual disks (262). A virtual disk may be a logical allocation of storage resources assigned to the example virtual machine (250).

The example virtual machine (250) may host any number and type of applications (252). The applications (252) may provide services to clients and/or other entities. The applications (252) may generate application data which is stored in the virtual disks (262.2, 262.4) stored in the persistent storage (260). For example, virtual disk A (262.2) may store disk A application data (264.2) and virtual disk N (262.4) may store disk N application data (264.4). The applications (252) may store any amount of application data in any of the virtual disks (262).

In some embodiments of the invention, each of the applications (252) may store application data in only one of the virtual disks (262.2, 262.4). By doing so, the application data for each of the applications (252) may be localized to one of the virtual disks (262).

The example virtual machine (250) may also host a virtual machine integrated backup agent (254). The virtual machine integrated backup agent (254) may provide data protection services including (i) generation of application data maps (266), (ii) restoration of the applications (252) using previously generated backups, and/or (iii) directing the applications to use remote application data hosted by the backup storages. The application data maps (266) may be data structures that include information that may be used to identify backups of the virtual disks (262, 264) that store application data associated with each of the applications (252). The application data maps (266) may also include information that may be used to identify relevant application data within the backups stored in the backup storages. Thus, the application data maps (266) may be used by the backup storages to selectively obtain data from previously stored backups that include relevant application data. Consequently, the applications may be directed to utilize such data to provide application services once remote access to the application data is provided by the backup storages.

To generate the application data maps (266), the virtual machine integrated backup agent (254) may (i) identify the virtual disk locations where each of the applications (252) are storing data, (ii) when a backup is generated for the example virtual machine (250), create an association between each virtual drive level backup of the backup that stores application data to the corresponding application, and (iii) create an association between each of the virtual drive level backups of the backup and universally unique identifiers (UUIDs) that may be used to identify access information for the respective virtual drive level backups in backup storage. For additional information regarding these associations, refer to FIG. 2.3. Such associations may be used to generate application data maps (266) and an associative backup storage catalog (268), both of which are discussed in greater detail below.

In one or more embodiments of the invention, the persistent storage (260) is a logical storage (e.g., virtualized storage) that utilizes any quantity of hardware storage resources of a production host (and/or other entity) that hosts the example virtual machine (250). For example, the persistent storage (260) may utilize portions of any combination of hard disk drives, solid state disk drives, tape drives, and/or any other physical storage medium of a production host and/or other entity for providing storage resources. Such storage resources may be used to host any number of virtual disks (262), application data (264.2, 264.4), and/or other data structures. Each of these data structures is discussed below.

In one or more embodiments of the invention, the application data maps (266) are data structures storing information regarding associations between applications and virtual machine level backups. The associations may be determined based on stored location of application data in the virtual disks (262).

For example, when a backup is generated, the backup may include any number of virtual disk level backups corresponding to each of the virtual disks (262). Thus, when a virtual disk level backup corresponding to a virtual disk is generated, the virtual disk level backup may be associated with any application that stores application data in the associated virtual disk.

In one or more embodiments of the invention, the associative backup storage catalog (268) is a data structure that stores information regarding associations between the virtual disk level backups stored in backup storage and UUIDs.

For example, when a virtual disk level backup is stored in backup storage, the stored virtual disk level backup may be assigned a QUID by the backup storage. The associative backup storage catalog (268) may specify these associations. As will be discussed in greater detail with respect to FIG. 3, the UUIDs assigned to each of the virtual disk level backups may be used to obtain access information for the virtual disk level backups stored in backup storage.

Thus, using the application data maps (266), the associative backup storage catalog (268), and the access information associated with each of the UUIDs assigned by the backup storages, access information associated with each of the applications (252) may be obtained. The access information, associated with each of the applications (252), may be used to extract all of the virtual machine level backups that include application data associated with each of the applications (252). By doing so, application data may be extracted from data stored in the backup storages.

To further clarify relationships between applications (252) and data stored in backup storage, a relationship diagram in accordance with one or more embodiments of the invention is shown in FIG. 2.3. The relationship diagram illustrates relationships between different portions of data of the system of FIG. 1.

As seen from the relationship diagram, a virtual machine backup (280) may be associated with any number of virtual disk level backups (282.2, 282.4). In other words, each virtual machine backup may include any number of virtual disk level backups.

Additionally, application data (284) may be associated with any number of virtual disk level backups (282.2, 282.4). In other words, application data (284), generated by an application, may be stored across any number of virtual disks. Consequently, any number of virtual disk level backups, associated with the virtual disk storing the application data (284), may be generated whenever a backup of a virtual machine is generated. However, in many scenarios there may be a one to one association between application data (284) and the virtual disk level backups associated with a particular virtual disk. For example, an application will frequently store application data in a single virtual disk.

Further each of the virtual disk level backups (e.g., 282.2, 282.4) may be associated with corresponding backup catalog identifiers (286.2, 286.4). A backup catalog identifier may be a UUID assigned by backup storage. Each backup catalog identifier (e.g., 286.2, 286.4) may be associated with corresponding access information. The access information may be used to extract a corresponding virtual disk level backup from backup storage.

Figure 3:
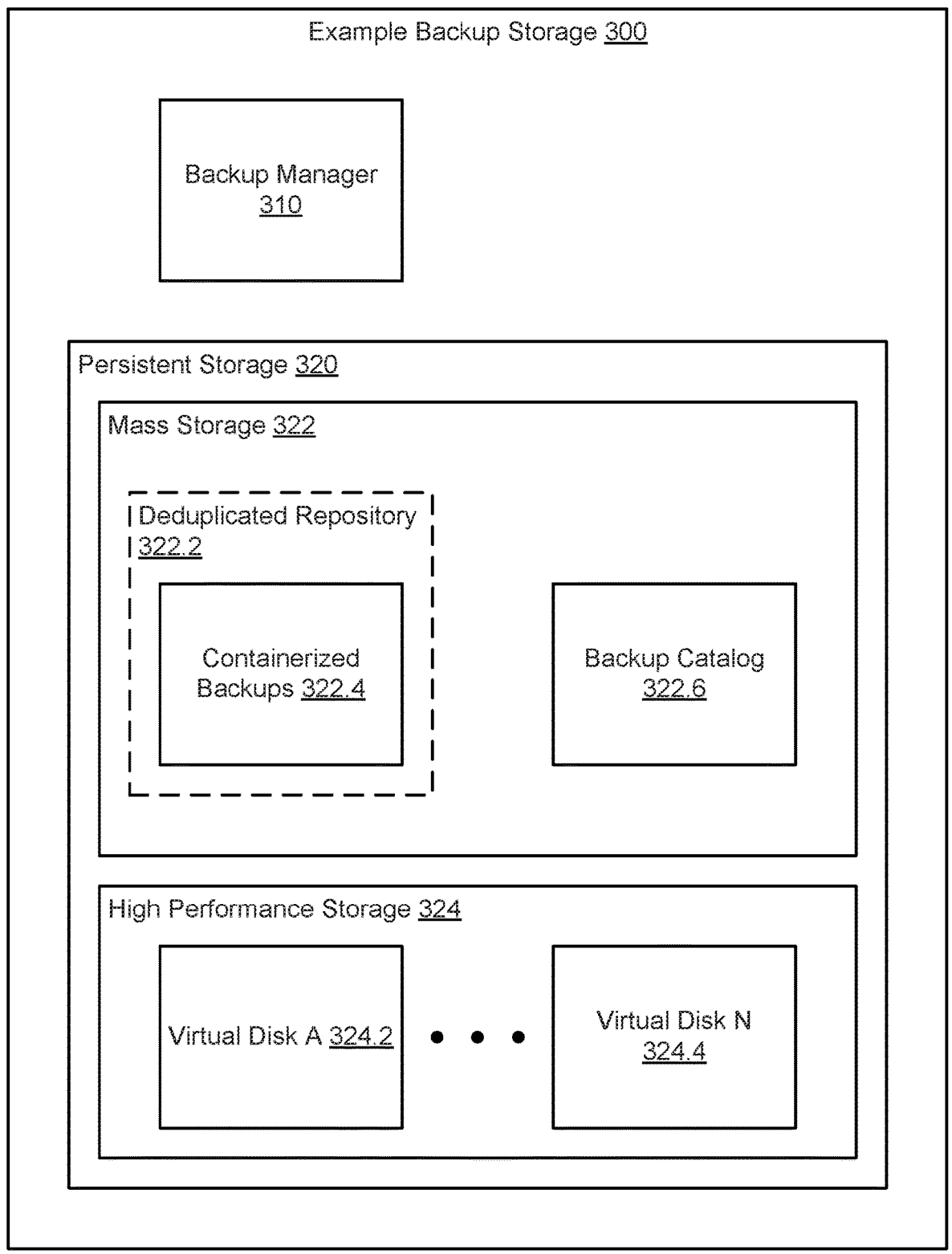
FIG. 3 shows a diagram of an example backup storage in accordance with one or more embodiments of the invention.

As discussed above, backups may be sent to backup storages for data integrity purposes. FIG. 3 shows a diagram of an example backup storage (300) in accordance with one or more embodiments of the invention. The example backup storage (300) may be similar to any of the backup storages (120, FIG. 1). As discussed above, the example backup storage (300) may store data such as backups that may be used for restoration purposes. Additionally, the example backup storage (300) may utilize the stored backups to obtain application data. The application data may be used to enable application to provide application services without performing a restoration of the application and/or a virtual machine that hosts the application.

To provide the aforementioned functionality of the example backup storage (300), the example backup storage (300) may include a backup manager (310) and a persistent storage (320). Each component of the example backup storage (300) is discussed below.

In one or more embodiments of the invention, the persistent storage (320) is a data storage device. For example, the persistent storage (320) may be any combination of hard disk drives, solid state disk drives, tape drives, and/or any other physical storage medium for the storage of data.

The persistent storage (320) may include mass storage (322) and high performance storage (324). The mass storage (322) may be a portion of the persistent storage (320) that provides storage resources economically while providing reasonable storage service performance. For example, the mass storage (322) may be storage resources provided by hard disk drives or tape drives. In contrast, the high performance storage (324) may be a portion f the persistent storage (320) that provides high storage service performance at an elevated cost compared to the mass storage (322). For example, the high performance storage (324) may be storage resources provided by solid state drives, e.g., flash.

In one or more embodiments of the invention, the backup manager (310) provides data storage services. For example, the backup manager (310) may orchestrate the storage of backups from production hosts in persistent storage (320) resulting in the storage of the backups. As discussed above, each backup may include any number of virtual disk level backups which, in turn, store different portions of application data and/or other types of data.

When providing data storage services, the backup manager (310) may deduplicate the backups against already-stored data. To deduplicate the backups for storage, the backup manager (310) may divide the backups into any number of portions (e.g., segments), comparing those portions to existing portions of data stored in a deduplicated repository (322.2), and only store the portions of the backups that are not duplicative of existing portions already stored in the deduplicated repository (322.2). Additionally, the example backup storage (300) may store instructions regarding how to combine different portions of data stored in the deduplicated repository (322.2) to obtain backups stored in a deduplicated manner in the deduplicated repository (322.2). By doing so, more backups may be stored in the example backup storage (300).

Additionally, to further improve the efficiency of storing data, the backup manager (310) may store the backups in a containerized format. For example, containerized backups (322.4), after deduplication, may be stored in the deduplicated repository (322.2). The containerized format may not include metadata or other information regarding the contents of each container of the containerized format. Rather, a containerized format may store volume data in discrete containers without including information regarding the structure of the data inside of each container. By doing so, the containerized format may have a smaller storage footprint when compared to other formats (e.g., file systems). Consequently, more backups may be stored as containerized backups (322.4) when compared to storing the backups in other formats that include metadata regarding the data. However, the information included in the containerized backups (322.4) may not be natively indexed and/or searched.

To provide a level of indexability, the backup manager (310) may generate a backup catalog (322.6) that stores information that enables virtual disk level backups to be retrieved. In other words, file-level access may not be available, but virtualized disk level indexing may be provided. Thus, the portions of data stored in the deduplicated repository (322.2) associated with each virtual disk level backup may be obtained using the backup catalog (322.6). By doing so, the total quantity of metadata may be minimized while still enabling indexing for virtual drive level aggregations of data to be provided.

The backup catalog (322.6) may be generated by the backup manager (310) as backups are obtained from production hosts. As discussed with respect to FIG. 2.2, the data of each virtual machine may be logically divided into any number of virtual disks. Consequently, when a backup of a virtual machine is obtained, appropriate location information may be added to the backup catalog (322.6) so that all of the data of any virtual disk level backup may be selectively obtained from the deduplicated repository (322.2) in a computationally efficient manner, e.g., no need to crawl the data of the deduplicated repository (322.2) to identify data associated with any particular virtual disk. When a virtual disk level backup is stored in backup storage, a UUID may be associated with the virtual disk level backup and its corresponding access information in the backup catalog (322.6).

The access information for obtaining each of the virtual disk level backups in the backup storage may be, for example, offsets, lengths, etc. for the deduplicated repository (322.2). The access information may be other types of information that enables virtual disk level backups to be extracted from the deduplicated repository (322.2) without departing from the invention.

In one or more embodiments of the invention, the backup manager (310) provides application data access services for applications. Application data access services may include (i) extracting one or more virtual disk level backups associated with the application from backup storage, (ii) locally mounting the virtual disk level backups as virtual disks (e.g., 324.2, 324.4) in the persistent storage (320), and (iii) provide remote access to the virtual disks (e.g., 324.2, 324.2). When providing application data access services, the backup manager (310) may perform all, or a portion of the methods of FIGS. 4-6.

In one or more embodiments of the invention, the backup manager (310) is a hardware device including circuitry. The backup manager (310) may be, for example, a digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be a hardware processor including circuitry such as, for example, a central processing unit or a microcontroller. The processor may be other types of hardware devices for processing digital information without departing from the invention.

While the example backup storage (300) of FIG. 3 has been described and illustrated as including a limited number of components for the sake of brevity, a backup storage in accordance with embodiments of the invention may include additional, fewer, and/or different components than those illustrated in FIG. 3 without departing from the invention.

Returning to FIG. 1, the backup storages may provide application data access services. FIG. 4 illustrates a method that may be performed by components of the system of FIG. 1 when providing such services.

FIG. 4 shows a flowchart of a method in accordance with one or more embodiments of the invention. The method depicted in FIG. 4 be used to provide application data access services in accordance with one or more embodiments of the invention. The method shown in FIG. 4 may be performed by, for example, a backup storage (e.g., 120, FIG. 1). Other components of the system illustrated in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, restoration request for an application is obtained.

In one or more embodiments of the invention, restoration request for the application is obtained from a remote agent. The remote agent may have determined that application services for the application are no longer available.

In step 402, at least one virtual disk level backup associated with the application is identified.

In one or more embodiments of the invention, the at least one virtual disk level backup associated with the application is identified using application data maps (266). For example, as described with respect to FIG. 2.2, the application data maps (266) may specify associations between applications and virtual disk level backups stored in backup storage.

In step 404, the at least one virtual disk level backup is obtained from deduplicated storage. For example, access information for each of the one or more virtual disk level backups may be obtained using a backup catalog (322.6, FIG. 3). The access information may be used to extract the at least one virtual disk level backup from the deduplicated storage, e.g., a deduplicated storage repository (322.2, FIG. 3).

In step 406, the at least one virtual disk level backup is mounted in high performance storage. Mount the virtual disk level backup in high performance storage, the copy of the at least one virtual disk level backup may be stored in high performance storage.

In step 408, remote access to the mounted at least one virtual disk level backup is provided to a production host hosting an instance of the application.

For example, the existing virtual machine hosting an instance of application may be provided remote access to the copy of the at least one virtual disk level backup stored in high performance storage. In another example, an instance of the application may be instantiated in an existing virtual machine. After instantiation, the virtual machine may be provided with remote access to the at least one virtual disk level backup stored in the high performance storage. In a still further example, a virtual machine that hosts an instance of the application may be restored in a production host. The restored virtual machine may be provided access to the at least one virtual disk level backup stored in the high performance storage. An instance of the application may be provided remote access to the mounted at least one virtual disk level backup via other methods without departing from the invention.

In one or more embodiments of the invention, remote access may be provided by having the production host remotely mount storage resources of the backup storage that include the at least one virtual disk level backup. For example, a file system of the production host may mount the at least one virtual disk level backup as a virtual disk. As noted above, the virtual disk level backups may reflect data of a virtual disk. Thus, the backup may be remotely mounted as a virtual disk.

In step 410, application services are provided using the instance of the application and the at least one virtual disk level backup.

In one or more embodiments of the invention, the application services are provided by having application treat the application data within the at least one virtual disk level backup as its application data. In other words, the instance of the application may be directed to use the application data associated with the application included in the at least one virtual disk level backup as its application data.

To provide application services, the instance of the application may service one or more requests from clients. Thus, by doing so, the clients may be provided access to the application data included in the at least one virtual disk level backup via the instance of the application.

The method may end following step 410.

By implementing the method of FIG. 4, remote applications may utilize application data hosted by backup storages to provide application services. Doing so may provide a faster route to provide application services to clients when compared to performing a restoration of an application and storing such application data locally for the application.

As discussed above, remote agents may manage application services being provided to clients. FIG. 5 shows a flowchart of a method in accordance with one or more embodiments of the invention. The method depicted in FIG. 5 may be used to manage application services in accordance with one or more embodiments of the invention. The method shown in FIG. 5 may be performed by, for example, remote agents (e.g., 110, FIG. 1). Other components of the system illustrated in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 502, an application service failure that causes an application service being provided to a client to be suspended is identified.

In one or more embodiments of the invention, the application service failure is caused by failure of an instance of an application to provide the application service.

In step 504, an instance of an application is instantiated in a production host. The instance of the application may be the type of application that provides the application services that are suspended.

In step 506, at least one virtual disk level backup that is associated with the application and is stored in the duplicated storage is identified.

In one or more embodiments of the invention, the at least one virtual disk level backup is identified based on an association between the at least one virtual disk level backup and an application. For example, as discussed above, associations between applications and virtual disk level backups may be continuously generated as the virtual disk level backups are generated. The associations may be based on the presence of application data associated with the application being present in the at least one virtual disk level backup.

In step 508, the at least one virtual disk level backup is extracted from the deduplicated storage to obtain a copy of the at least one virtual disk level backup.

In one or more embodiments of the invention, the at least one virtual disk level backup is extracted using access information associated with the at least one virtual disk level backup. For example, a UUID associated with at least one virtual disk level backup may be used as a key to obtain the associated access information. The access information may include information that enables the at least one virtual disk level backup extracted from the deduplicated storage.

In step 510, the copy of the at least one virtual disk level backup exposed to the production host. The production host may host the instance of the application.

In one or more embodiments of the invention, the copy of the at least one virtual disk level backup is exposed to the production host by providing the production host remote access to the copy of the at least one virtual disk level backup.

In one or more embodiments of the invention, remote access to the copy of the at least one virtual disk level backup is obtained by mapping the at least one virtual disk level backup as a remote virtual disk for a virtual machine hosted by the production host. The virtual machine hosted by the production host may host the instance of the application.

The remote access to the copy of the at least one virtual disk level backup enables the instance of the application to remotely access the copy of the at least one virtual disk level backup. For example, a file system of the virtual machine may map the at least one virtual disk level backup as a remote virtual disk.

In step 512, application data associated with the application within the copy of the at least one virtual disk level backup is identified. For example, when the at least one virtual disk level backup is generated, information regarding the location of the at application data within the at least one virtual disk level backup may be saved. Such information may be used to access the application data.

The application data may be accessed via other methods without departing from the invention. For example, the contents of the copy of the at least one virtual disk level backup may be interrogated to identify the portion of the copy of the at least one virtual disk level backup that represents the application data.

In step 514, an application services session for a client is transitioned to the instance of the application. For example, the client may have been an application services session with a second instance of the application. The second instance of the application may have failed. To remediate the failure of the second instance of the application, the remote agent may provide instructions to the client to utilize the new instance of the application to conduct the application services session. Transitioning the application services session to the instance of the application may cause the client to begin utilizing the instance of the application to obtain application services.

In step 516, the application services for the client are resumed using the instance of the application and application data. For example, once a client begins utilizing the instance of the application for application services, the instance of the application may utilize the application data hosted by the remote storage to service the client. By doing so, the application services provided by the instance of the application reflect the application data stored in the backup storage rather than local application data.

The method may end following step 516.

As discussed above, production hosts may generate backups. FIG. 6 shows a flowchart of a method in accordance with one or more embodiments of the invention. The method depicted in FIG. 6 be used to manage application services in accordance with one or more embodiments of the invention. The method shown in FIG. 6 may be performed by, for example, production hosts (e.g., 130, FIG. 1). Other components of the system illustrated in FIG. 1 may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In step 600, a backup generation request for a virtual machine is obtained.

In one or more embodiments of the invention, the backup generation request is obtained from a remote agent. The remote agent may send the backup generation request in accordance with one or more backup generation policies. The backup generation request may request that a backup for the virtual machine be generated.

In step 602, a virtual disk level backup for each virtual disk of the virtual machine is generated. The virtual disk level backups may be generated as part of the process of generating a backup for the virtual machine. The virtual disk level backups may be distinguishable portions of the backup for the virtual machine.

The virtual disk level backups may include information that may be used to restore the state of a virtual disk to reflect a prior point in time. One or more of the virtual disk level backups may include application data.

In step 604, each of the virtual disk level backups are associated with applications hosted by the virtual machine. For example, one or more of the virtual disks may include application data of one or more applications. The associations may be made by storing such relationships in the application data map. The application data map may, for each application, specify each of the virtual disk level backups of the backup of the virtual machine that include application data of each respective application.

In step 606, each of the virtual disk level backups are associated with corresponding backup catalog identifiers. For example, when the one or more virtual disks are stored in backup storage, they may each be assigned a respective UUID. The association may be made by storing such relationships in an associative backup storage catalog. Thus, using the associative backup storage catalog and the application data maps, associations between applications and UUIDs may be generated. As discussed previously, the UUIDs may be used to obtain access information that enables each of the stored virtual disk level backups to be extracted from backup storage.

In step 608, the virtual disk level backups are stored in backup storage. Copies of the application data maps and/or associative backup storage catalog may also be stored in backup storage. Copies of these data structures and/or a backup catalog may be stored in other locations such as, for example, remote agents to enable any number of entities to efficiently obtain access information for virtual machine level backups associated with applications.

The method may end following Step 608.

To further clarify embodiments of the invention, a non-limiting example is provided in FIGS. 7.1-7.6. Each of these figures may illustrate a system similar to that illustrated in FIG. 1 at different points in times. For the sake of brevity, only a limited number of components of the system of FIG. 1 are illustrated in each of FIGS. 7.1-7.6.

Example

Consider a scenario as illustrated in FIG. 7.1 in which a first production host (700) and a second production host (710) are providing services to clients (not shown). The first production host (700) may host a database application (702) that provides database services to the clients. To provide database service to the clients, the database application (702) may store data in a first virtual disk (704). While not illustrated in FIG. 7.1, the database application (702) and the first virtual disk (704) are part of a virtual machine.

The second production host (710) hosts an email application (712) that provides electronic communication services to the clients.

To provide data protection services to the first production host (700) and the second production host (710), the system includes a backup storage (720). The backup storage (720) provides data protection services by storing backups in a deduplicated repository (724) hosted by the volume storage (722). In addition to data protection services, the backup storage (720) also facilitates rapid resumption of application services by hosting copies of application data in high performance storage (730). In the system state illustrated in FIG. 7.1, the backup storage (720) is not facilitating resumption of application services because no application data is stored in the high performance storage (730). Consequently, the applications are able remotely utilize such data.

As the clients utilize services provided by the first production host (700) data that is relevant to the clients is stored in the first production host (700) as database application data (704.2). When utilizing the services provided by the first production host (700), the clients send sales data to the database application (702) for storage as part of the database application data (704.2).

At a first point in time, a remote agent (not shown) initiates a backup generation for the first production host (700). The backup generation is initiated because a backup policy indicates that a backup of the first production host (700) is to be generated at the first point in time. To initiate the backup generation, the remote agent sends a backup generation request to the first production host (700).

In response to receiving the backup generation request, the first production host (700) generates a backup including a first virtual disk backup (706) as shown in FIG. 7.2.

Additionally, the first production host (700) generates associations between the database application and the first virtual disk backup (706). Once the first virtual disk backup (706) is generated, the first production host (700) sends a copy of the first virtual disk backup (706) to the backup storage (720) for storage.

In response to receiving backup, the backup storage (720) stores a copy of the first virtual disk backup (726) in the deduplicated repository (724) as shown in FIG. 7.3. When storing the copy of the first virtual disk backup (726), the backup storage (720) assigns an identifier to the backup which is used by the first production host (700) to form an association between the identifier and the database application (702). Additionally, the backup storage (720) stores access information for the copy of the first virtual disk backup (726) and associates the access information with identifier of the copy of the first virtual disk backup (726).

In the state shown in FIG. 7.3, the system is capable of restoring the database application (702) and the entire virtual machine that hosts the database application (702) and includes the first virtual disk (704). Additionally, the system is capable of extracting the copy of the first virtual disk backup (726) using the associations between the database application (702) and the access information for the copy of the first virtual disk backup (726).

After storing the copy of the first virtual disk backup (726) in the volume storage (722), the first production host (700) fails as illustrated in FIG. 7.4. Due to the failure of the first production host (700), database services that were being provided to the clients (not shown) are suspended because the database application (702) is no longer available to provide the database services.

In response to the failure of the first production host (700), the remote agent (not shown) initiates the process of restoring database services. To do so, the remote agent (not shown) sends instructions to the backup storage (720) to extract the copy of the first virtual disk backup (726) from the volume storage (722) and store the extracting copy of the first virtual disk backup and the high performance storage (730).

In response to these instructions, the backup storage (720) stores the extracted copy of the first virtual disk backup (732) in the high performance storage (730) as illustrated in FIG. 7.5. As seen from FIG. 7.5, the extracted copy of the first virtual disk backup (732) includes a copy of the database application data (734).

To facilitate resumption of database services using the copy of the database application data (734), the remote agent sends instructions to the second production host (710) to instantiate a new instance of the database application (702). In response to these instructions, the second production host (710) instantiates a new instance of the database application (714) as illustrated in FIG. 7.6.

Once instantiated, the copy of the database application data (734) is exposed to the second production host (710). The new instance of the database application (714) is directed to use the copy of the database application data (734) as its application data. When so directed, the new instance of the database application (714) begins providing database application services to the clients and, thus, resumes the provision of database application services to the clients.

In the state of the system illustrated in FIG. 7.6, the new instance of the database application (714) is able to provide similar database services to those provided by the database application (702) because both applications utilized similar application data. Additionally, because the new instance of the database application (714) remotely accesses the copy of the database application data (734), the new instance of the database application (714) is able to provide database services without performing a restoration based on the backup data stored in the deduplicated repository (724). Consequently, the new instance of the database application (714) is able to much more quickly provide database services to the clients when compared to restoring the local copy of the application data and then providing database services using the local copy of the application data.

End of Example

Figure 8:
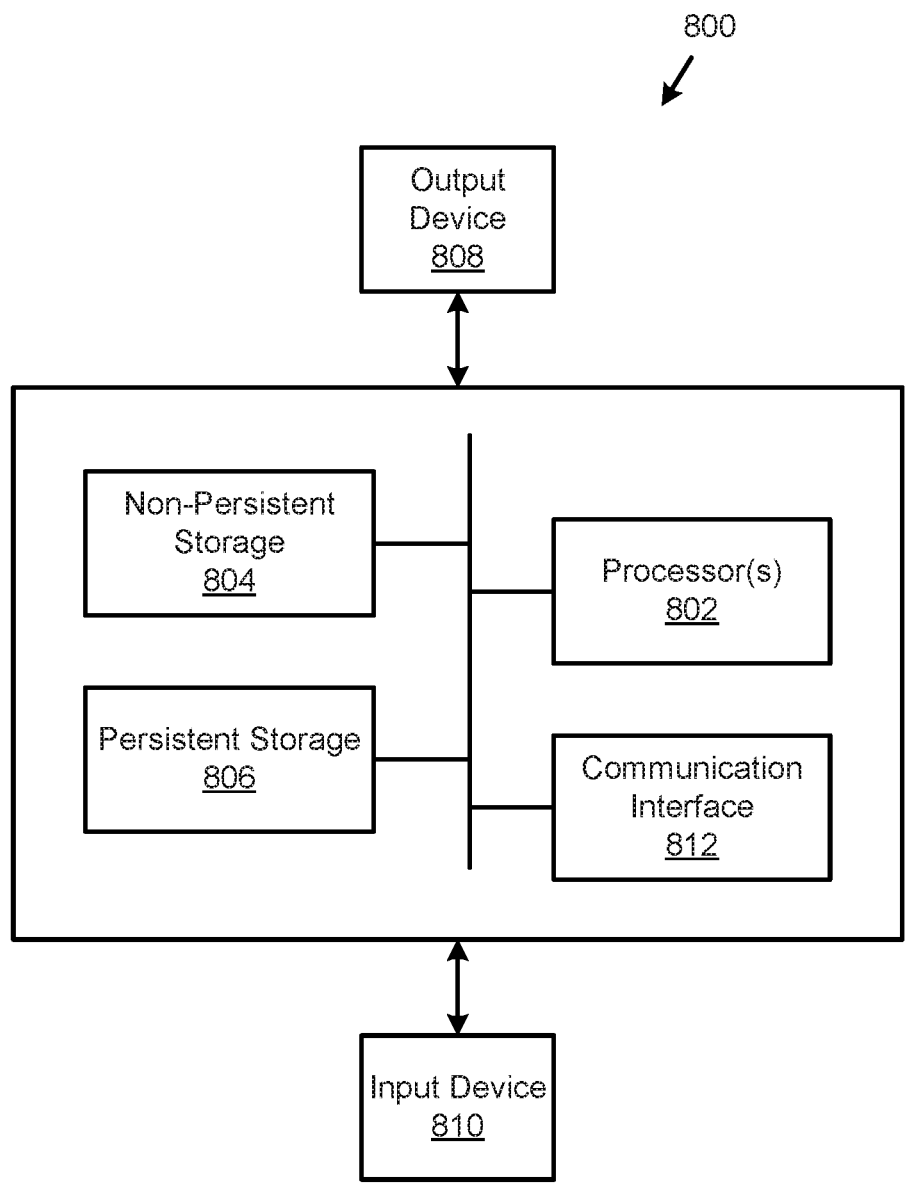
FIG. 8 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may provide a system that facilitates rapid restoration of application services. The application services may be rapidly restored by extracting relevant application data from backup data stored in a format that is not easily and/or natively searchable, nor indexed granularly. Thus, embodiments of the invention may facilitate restoration of application services while storing data that may be used to restore such services in a format that has a reduced storage footprint size when compared to other formats that may provide granular indexing and/or searchability.

Thus, embodiments of the invention may address the problem of the limited availability of computational resources in a distributed system that relies on data redundancy for restoration purposes. Specifically, embodiments of the invention may improve the speed at which application services may be restored following a failure of an application that provides such services.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A system for providing an application service to clients, comprising:
   backup storage comprising persistent storage, wherein the persistent storage comprises:
      mass storage for storing deduplicated backups, and
      high performance storage; and
   a remote agent programmed to:
      identify a failure of the application service that causes the application service to be suspended;
      in response to identifying the failure:
         instantiate an instance of an application for providing the application service in a production host;
         identify at least one virtual disk level backup that is:
            associated with the application; and
            is a portion of the deduplicated backups;
         extract the at least one virtual disk level backup from the deduplicated backups on the mass storage to obtain a copy of the at least one virtual disk level backup, wherein the copy of the at least one virtual disk level backup is stored in the high performance storage;
         expose the copy of the at least one virtual disk level backup to the production host by providing the production host remote access to the high performance storage;
         identify application data associated with the application within the copy of the at least one virtual disk level backup on the high performance storage;
         transition an application service session for a client of the clients to the instance of the application; and
         resume the application service for the client using the instance of the application and the application data, wherein the application service accesses the application data using the provided remote access to the high performance storage.

2. The system of claim 1, wherein the application service is resumed while the application data is remote from the instance of the application.

3. The system of claim 1, wherein the at least one virtual disk level backup is identified using a universally unique identifier associated the at least one virtual disk level backup and an association between the universally unique identifier and the application.

4. The system of claim 1, wherein deduplicated backups comprises a plurality of backups of virtual machines.

5. The system of claim 4, wherein at least one of the plurality of backups of the virtual machines comprises the virtual disk level backup and a second virtual disk level backup.

6. The system of claim 4, wherein the deduplicated backups are stored in a format that only natively supports virtual disk level indexing.

7. The system of claim 1, wherein the at least one virtual disk level backup is extracted from the deduplicated backups by combining a plurality of segments of the deduplicated backups to obtain the copy of the at least one virtual disk level backup.

8. A method for providing an application service to clients, comprising:
   identifying a failure of the application service that causes the application service to be suspended;
   in response to identifying the failure:
      instantiating an instance of an application for providing the application service in a production host;
      identifying at least one virtual disk level backup that is:
         associated with the application; and
         is a portion of deduplicated backups;
      extracting the at least one virtual disk level backup from deduplicated backups on a mass storage to obtain a copy of the at least one virtual disk level backup, wherein the copy of the at least one virtual disk level backup is stored in a high performance storage, wherein the mass storage and the high performance storage are located on a backup storage that is external to the production host;
      exposing the copy of the at least one virtual disk level backup to the production host by providing the production host remote access to the high performance storage;
      identifying application data associated with the application within the copy of the at least one virtual disk level backup on the high performance storage;
      transitioning an application service session for a client of the clients to the instance of the application; and
      resuming the application service for the client using the instance of the application and the application data, wherein the application service accesses the application data using the provided remote access to the high performance storage.

9. The method of claim 8, wherein the application service is resumed while the application data is remote from the instance of the application.

10. The method of claim 8, wherein the at least one virtual disk level backup is identified using a universally unique identifier associated the at least one virtual disk level backup and an association between the universally unique identifier and the application.

11. The method of claim 8, wherein deduplicated backups comprises a plurality of backups of virtual machines.

12. The method of claim 11, wherein at least one of the plurality of backups of the virtual machines comprises the virtual disk level backup and a second virtual disk level backup.

13. The method of claim 11, wherein the deduplicated backups are stored in a format that only natively supports virtual disk level indexing.

14. The method of claim 8, wherein the at least one virtual disk level backup is extracted from the deduplicated backups by combining a plurality of segments of the deduplicated backups to obtain the copy of the at least one virtual disk level backup.

15. A non-transitory computer readable medium comprising computer readable program code, which when executed by a computer processor enables the computer processor to perform a method for providing an application service to clients, the method comprising:
   identifying a failure of the application service that causes the application service to be suspended;
   in response to identifying the failure:
      instantiating an instance of an application for providing the application service in a production host;
      identifying at least one virtual disk level backup that is:
         associated with the application; and
         is a portion of deduplicated backups;
      extracting the at least one virtual disk level backup from deduplicated backups on a mass storage to obtain a copy of the at least one virtual disk level backup, wherein the copy of the at least one virtual disk level backup is stored in a high performance storage, wherein the mass storage and the high performance storage are located on a backup storage that is external to the production host;
      exposing the copy of the at least one virtual disk level backup to the production host by providing the production host remote access to the high performance storage;
      identifying application data associated with the application within the copy of the at least one virtual disk level backup on the high performance storage;
      transitioning an application service session for a client of the clients to the instance of the application; and
      resuming the application service for the client using the instance of the application and the application data, wherein the application service accesses the application data using the provided remote access to the high performance storage.

16. The non-transitory computer readable medium of claim 15, wherein the application service is resumed while the application data is remote from the instance of the application.

17. The non-transitory computer readable medium of claim 15, wherein the at least one virtual disk level backup is identified using a universally unique identifier associated the at least one virtual disk level backup and an association between the universally unique identifier and the application.

18. The non-transitory computer readable medium of claim 15, wherein deduplicated backups comprises a plurality of backups of virtual machines.

19. The non-transitory computer readable medium of claim 18, wherein at least one of the plurality of backups of the virtual machines comprises the virtual disk level backup and a second virtual disk level backup.

20. The non-transitory computer readable medium of claim 18, wherein the deduplicated backups are stored in a format that only natively supports virtual disk level indexing.

* * * * *